(12) United States Patent
Ku

(10) Patent No.: US 8,514,327 B2
(45) Date of Patent: Aug. 20, 2013

(54) VOICE COIL MOTOR AND CAMERA MODULE USING SAME

(75) Inventor: Ping-Han Ku, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 9 days.

(21) Appl. No.: 13/427,918

(22) Filed: Mar. 23, 2012

(65) Prior Publication Data

US 2013/0128107 A1 May 23, 2013

(30) Foreign Application Priority Data

Nov. 23, 2011 (TW) .................................. 100142935

(51) Int. Cl.
*H04N 5/225* (2006.01)
*H04N 5/232* (2006.01)
*G02B 7/02* (2006.01)
*G03B 17/00* (2006.01)
*G03B 3/00* (2006.01)

(52) U.S. Cl.
USPC ........... 348/374; 348/375; 348/345; 348/376; 359/824; 359/823; 359/819; 359/813; 396/75; 396/79; 396/80; 396/133

(58) Field of Classification Search
USPC ................. 348/373–376, 345; 359/811, 813, 359/814, 819, 823, 824; 396/75, 79, 80, 396/133
See application file for complete search history.

(56) References Cited

U.S. PATENT DOCUMENTS

| | | | | |
|---|---|---|---|---|
| 2009/0262438 A1* | 10/2009 | Chou et al. | .................... | 359/696 |
| 2010/0046099 A1* | 2/2010 | Liao | .............................. | 359/824 |
| 2010/0142065 A1* | 6/2010 | Liao | .............................. | 359/824 |
| 2010/0270870 A1* | 10/2010 | Liao | ........................... | 310/12.16 |
| 2010/0271541 A1* | 10/2010 | Chou | ............................ | 348/374 |
| 2011/0249352 A1* | 10/2011 | Ku et al. | ....................... | 359/824 |
| 2012/0162791 A1* | 6/2012 | Ku | ................................ | 359/824 |
| 2012/0162792 A1* | 6/2012 | Huang | .......................... | 359/824 |

* cited by examiner

*Primary Examiner* — Nhan T Tran
*Assistant Examiner* — Marly Camargo
(74) *Attorney, Agent, or Firm* — Altis Law Group, Inc.

(57) ABSTRACT

A voice coil motor includes a stationary magnetic field generator having a supporting frame, a moveable magnetic field generator, a case and a double sided adhesive layer. The supporting frame defines a first receiving space receiving the moveable magnetic field generator. The moveable magnetic field generator defines a second receiving space. The case encloses the stationary magnetic field generator, the moveable magnetic field generator and the double sided adhesive layer and includes a bottom plate and side plates. The bottom plate includes a first surface and a second surface facing away the first surface. The side plates extend from the second surface. The bottom plate defines a through hole. A diameter of the through hole is smaller than that of the second receiving space. The double sided adhesive layer is entirely covering the second face.

20 Claims, 3 Drawing Sheets

VOICE COIL MOTOR AND CAMERA MODULE USING SAME

BACKGROUND

1. Technical Field

The present disclosure relates to a voice coil motor and a camera module using the voice coil motor.

2. Description of Related Art

Voice coil motors (VCMs) are widely used as lens actuators in camera modules. A typical VCM includes a stationary magnetic field generator, a moveable magnetic field generator, at least one elastic member elastically connecting the stationary magnetic field generator and the moveable magnetic field generator, and a case receiving all the above-mentioned elements. The moveable magnetic field generator is moveably received in the stationary magnetic field generator.

In assembly of a camera module, a lens barrel is screwed to the moveable magnetic field generator. Friction between internal threads of the moveable magnetic field generator and external threads of the lens barrel may produce some particles, in assembly. The particles may fall onto an image sensors, thus deteriorating imaging quality of the camera module.

Therefore, it is desirable to provide a voice coil motor and camera module, which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
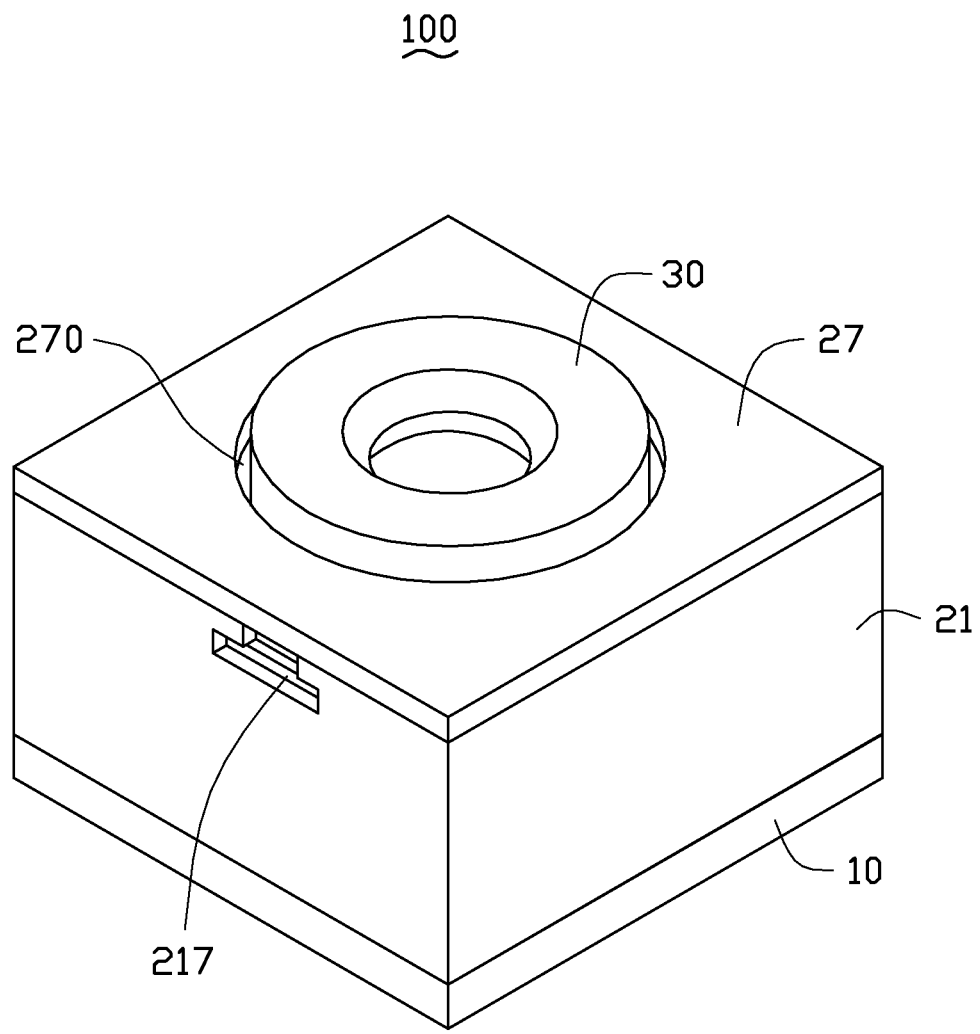
FIG. 1 is an assembled, isometric view of a camera module, according to an exemplary embodiment.
Figure 2:
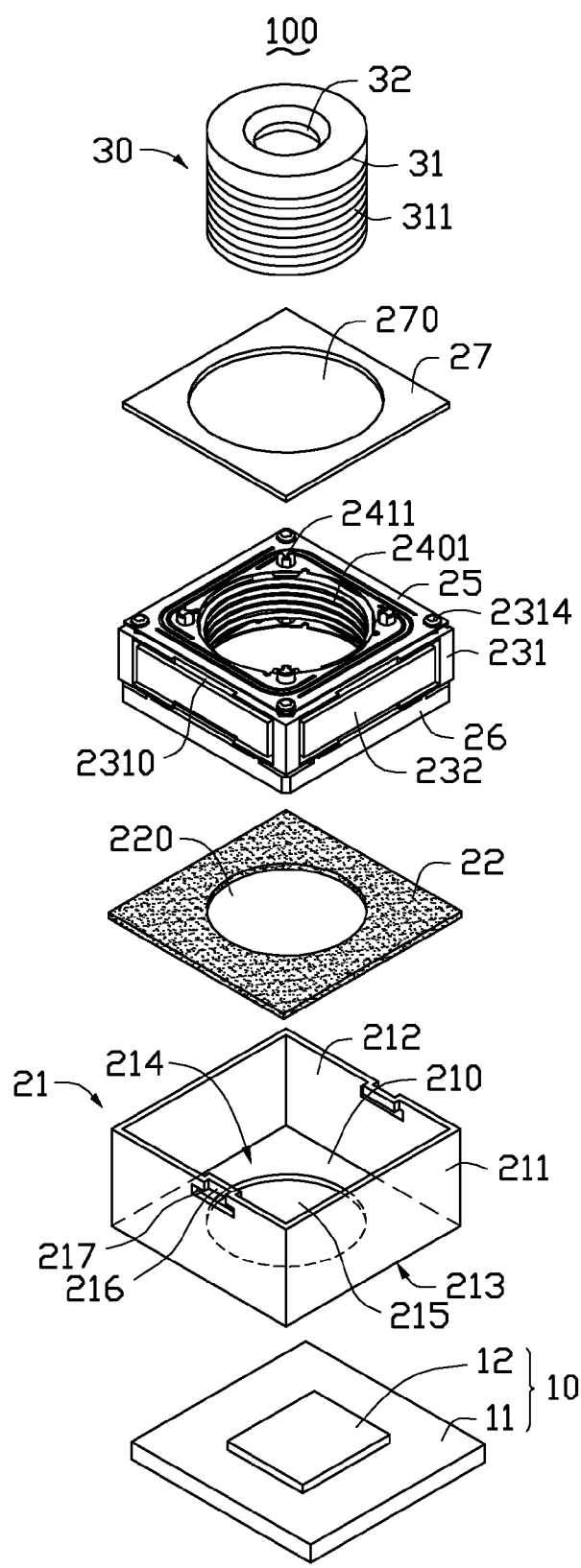
FIG. 2 is an exploded, isometric view of the camera module of FIG. 1, which includes a voice coil motor.
Figure 3:
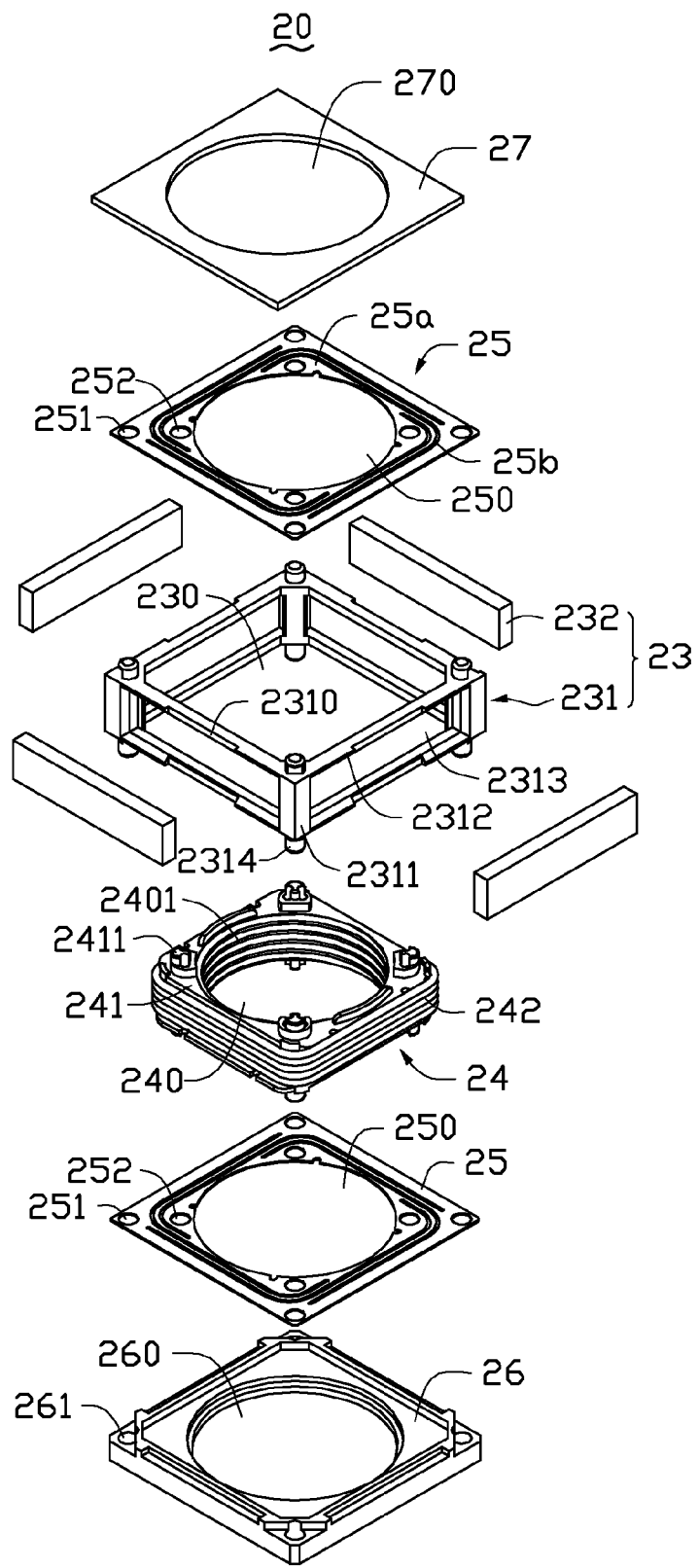
FIG. 3 is an exploded, isometric view of the voice coil motor of FIG. 2.

Referring to FIGS. 1-3, a camera module 100, according to an exemplary embodiment, includes an image sensor unit 10, a voice coil motor 20 (VCM), and a lens module 30.

The image sensor unit 10 includes a substrate 11 and an image sensor 12 mounted on the substrate 11 and electrically connected with the substrate 11.

The VCM 20 is positioned on the substrate 11 and surrounds the image sensor 12. The VCM 20 includes a case 21, a double sided adhesive layer 22, a stationary magnetic field generator 23, a moveable magnetic field generator 24, and two elastic plates 25, a base 26, and a front cover 27.

In this embodiment, the case 21 is substantially rectangular shaped and includes a bottom plate 210 and four side plates 211. The bottom plate 210 is positioned on the substrate 11, and includes a first surface 213 contacted with the substrate 11 and a second surface 214 facing away the first surface 213. The four side plates 211 perpendicularly extend upwards from the second surface 214, respectively. The bottom plate 210 and the four side plates 221 cooperatively form a receiving room 212 for receiving the stationary magnetic field generator 23, the moveable magnetic field generator 24, the two elastic plates 25, and the base 26. A center of the bottom plate 210 defines a circular first through hole 215. The image sensor 12 passes through the first through hole 215 and is received in the receiving room 212. Each upper portion of two side plates 211, which are opposing each other, forms a projection 216 perpendicularly protruding inwards from the corresponding side plate 211 and protruding towards the receiving room 212. Projections 216 of the two opposing side plates 211 are aligned with each other. Each of the projections 216 defines a recess 217 for facilitating receiving of the voice coil motor 20.

In other embodiments, the four side plates 211 can have only one projection 216, or one side plate 211 can have more than two projections 216.

In the embodiment, the double sided adhesive layer 22 entirely covers the second face 214 of the bottom plate 210 with one face of the double sided adhesive layer 22 being positioned on the second face 214. The double sided adhesive layer 22 also defines a circular first opening 220 corresponding to the first through hole 215 of the bottom plate 210. The size of the first opening 220 is equal to that of the first through hole 215.

The stationary magnetic field generator 23 includes a supporting frame 231 and four permanent magnetic elements 232 mounted on the supporting frame 231.

The supporting frame 231 is substantially a cuboid frame and defines a first receiving space 230. The first receiving space 230 is configured for receiving the moveable magnetic field generator 24. The supporting frame 231 includes four longitudinal posts 2311 and eight latitudinal posts 2312. Each two of the latitudinal posts 2312 are opposite to each other and correspondingly connect to two of the adjacent longitudinal posts 2311. The longitudinal posts 2312 and the latitudinal posts 2311 at each side of the supporting frame 231 cooperatively form a first receiving recess 2313. The first receiving recess 2313 is in communication with the first receiving space 230. The permanent magnetic elements 232 are correspondingly received in the first receiving recesses 2313, thereby mounting to the peripheral sides of the supporting frame 231 serving as sidewalls of the stationary magnetic field generator 23.

Two first positioning posts 2314 extend along an axial direction of the longitudinal post 2311 from two opposite ends of each longitudinal post 2311. In the illustrated embodiment, two opposite pairs of latitudinal posts 2312 each define a cutout 2310 spatially corresponding to a respective projection 216. Each projection 216 snaps in a corresponding cutout 2310, such that the stationary magnetic field generator 23 is fastened to the case 21.

The moveable magnetic field generator 24 is moveably received in the first receiving space 230. The moveable magnetic field generator 24 includes a hollow core member 241, and a coil 242 wrapped around the core member 241. The core member 41 defines a second receiving space 240 in a center of the core member. The second receiving space 240 is configured for receiving the lens module 30. An optical axis of the lens module 30 coincides with a central axis of the core member 241. The shape of the second receiving space 240 is circular, and the diameter of the second receiving space 240 is larger than that of the first through hole 215. The moveable magnetic field generator 24 has internal threads 2401 formed on an internal wall of the second receiving space 240. The top end and the bottom end of the core member 241 each includes four second positioning posts 2411. The four second positioning posts 2411 perpendicularly extend upwards from each of the top and bottom ends of the core member 241 parallel to the central axis of the core member 241.

Both two elastic plates 25 contact the stationary magnetic field generator 23 and the moveable magnetic field generator 24. In the illustrated embodiment, both two elastic plates 25 are substantially a rectangular sheet, with a second through hole 250 defined in a center. Each elastic plate 25 is made from metal, such as copper or aluminum.

Each elastic plate 25 includes substantially rectangular elastic portions 25a around the second through hole 250. The elastic portions 25a define a number of slots 25b around the second through hole 250, thereby enabling the elastic plate 25 to have elasticity. In the illustrated embodiment, there are three slots 25b, each of which is generally U-shaped. Each elastic plate 25 also has four first positioning holes 251 and defines four guiding holes 252. The guiding holes 252 are defined in the elastic portions 25a for correspondingly locating the second positioning posts 2411. The first positioning holes 251 are respectively defined in the corners of the elastic plate 25, corresponding to the four first positioning posts 2314.

The base 26 includes a third through hole 260 defined in a center, and four positioning opening 261 surrounding the third through hole 260. The base 26 is made from an electromagnetic shielding material, such as copernik, conductive plastic, or conductive glass.

The shape and size of the front cover 27 correspond to that of the case 21, as such, the front cover 27 is capable of covering the case 21. The front cover 27 includes a circular second opening 270 defined in a center of the front cover 27. The diameter of the second opening 270 is slightly larger than that of the second receiving space 240. The second opening 270 and the second through holes 250 are aligned with each other and are in communication with the second receiving space 240.

The lens module 30 includes a lens barrel 31 and a number of lens 32 received in the lens barrel 31. The lens module 30 has external threads 311 formed on an external wall of the lens barrel 31 for being threadedly engaged with the internal threads 2401 of the moveable magnetic field generator 24, thereby the lens barrel 31 is received in and is engaged with the moveable magnetic field generator 24. The internal diameter of the lens barrel 31 is smaller than or equal to that of the diameter of the first through hole 215 of the case 21.

In assembly of the VCM 20, the moveable magnetic field generator 24 is received in the first receiving space 230 of the supporting frame 231. Each of the first positioning posts 2314 at the top and bottom ends of the longitudinal post 2311 extends fixedly through a respective one of the first positioning holes 251 to position the elastic plate 25 on the supporting frame 231. Each of the second positioning posts 2411 extends through a corresponding guiding hole 252. The first positioning posts 2314 at the bottom end of the supporting frame 231 are fittingly positioned in the positioning openings 261. Thus, the stationary magnetic field generator 23 is attached to the base 26.

The assembled stationary magnetic field generator 23, the moveable magnetic field generator 24, the elastic plates 25, and the base 26 are all received in the case 21 with each projection 216 snapping in a respective cutout 2310. The lens module 30 is screwed into the core member 241. Due to the diameter of the second receiving space 240 of the core member 241 being larger than that of the first through hole 215 and the first opening 220, and the double sided adhesive layer 22 entirely covers the second face 214 of the bottom plate 210, as such, particles disengaging between the external threads 311 of the lens barrel 31 and the internal threads 2401 of the moveable magnetic field generator 24 are absorbed by the double sided adhesive layer 22, in assembly. The double sided adhesive layer 22 prevents particles from falling on the image sensor 12, improving imaging quality of the camera module 100. The front cover 27 is positioned on one end of each side plate 211 of the case 21 away from the bottom plate 210, the lens module 30 passes through the second opening 270, as such, assembly of the VCM 20 is completed. Finally, the assembled VCM 20 is positioned on the substrate 11. Therefore, assembly of the camera module 100 is completed.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor comprising:
   a base;
   a stationary magnetic field generator mounted on the base, and comprising a supporting frame and a plurality of permanent magnetic elements mounted on the supporting frame, the supporting frame defined a first receiving space, the magnetic elements being positioned around the first receiving space;
   a moveable magnetic field generator moveably received in the first receiving space, the moveable magnetic field generator comprising a core member and a coil wrapped around the core member, the moveable magnetic field generator defining a second receiving space in its center for being threadedly engaged with a lens module, the moveable magnetic field generator having internal threads formed on an internal wall of the second receiving space; and
   a case comprising a bottom plate and side plates, the bottom plate comprising a first surface and a second surface facing away the first surface, the side plates extending from the bottom plate, the bottom plate and the side plates cooperatively defining a receiving room, the receiving room receiving the stationary magnetic field generator, the moveable magnetic field generator, and the base, a center of the bottom plate defining a circular first through hole, a diameter of the first through hole being smaller than a diameter of the second receiving space; and
   a double sided adhesive layer received in the receiving room and entirely covering the second face of the bottom plate.

2. The voice coil motor of claim 1, wherein the supporting frame is substantially a cuboid frame and comprises four longitudinal posts and eight latitudinal posts, the longitudinal posts and the latitudinal posts at each side of the supporting frame cooperatively define a first receiving recess, the first receiving recess is in communication with the first receiving space and receives a respective permanent magnetic element.

3. The voice coil motor of claim 2, wherein each upper portion of two side plates, which are opposite to each other, forms a projection perpendicularly protruding inwards from the corresponding side plate and protruding towards the receiving room, two opposite pairs of latitudinal posts each define a cutout, each projection snaps in a respective cutout.

4. The voice coil motor of claim 2, further comprising two elastic plates, wherein two first positioning posts extend along an axial direction of the longitudinal posts from two opposite ends of each longitudinal post, each of the elastic plates has four first positioning holes defined in its corners, and each of the first positioning holes receives a respective one of the first positioning posts to position the two elastic plates on two opposite ends of the supporting frame.

5. The voice coil motor of claim 4, wherein the core member comprises a top end and a bottom end, the core member also comprises eight second positioning posts, each four second positioning posts perpendicularly extend from a respective one of the top and bottom ends and are parallel to a central axis of the core member, each of the two elastic plates is substantially a rectangular sheet and comprises a second through hole defined in its center, each elastic plate comprises a substantially rectangular elastic portions around the second through hole and has four guiding holes defined in the elastic portion, and each guiding hole receives a respective one of the second positioning posts to position the two elastic plates on the top end and the bottom end.

6. The voice coil motor of claim 5, wherein each elastic portion defines a plurality of slots around the second through hole.

7. The voice coil motor of claim 5, wherein the base comprises a third through hole defined in its center, and four positioning openings around the third through hole, four first positioning posts adjacent to the bottom end are positioned in the positioning openings.

8. The voice coil motor of claim 1, wherein the double sided adhesive layer defines a circular first opening aligned with the first through hole of the bottom plate, and a diameter of the first opening is equal to the diameter of the first through hole.

9. The voice coil motor of claim 1, further comprising a front cover, wherein the shape and size of the front cover correspond to that of the case, the front cover covers the receiving room.

10. The voice coil motor of claim 9, wherein the front cover comprises a circular second opening defined in its center, a diameter of the second opening is slightly larger than that of the second receiving space.

11. A camera module comprising:
an image sensor unit comprising a substrate and an image sensor mounted on the substrate;
a lens module comprising a lens barrel and a plurality of lens received in the lens barrel, the lens module having external threads formed on an external wall of the lens barrel; and
a voice coil motor positioned on the substrate, and comprising:
a base;
a stationary magnetic field generator mounted on the base, and comprising a supporting frame and a plurality of permanent magnetic elements mounted on the supporting frame, the supporting frame defined a first receiving space, the magnetic elements positioned around the first receiving space;
a moveable magnetic field generator moveably received in the first receiving space, the moveable magnetic field generator comprising a core member and a coil wrapped around the core member, the moveable magnetic field generator defining a second receiving space in its center, the moveable magnetic field generator having internal threads formed on an internal wall of the second receiving space, the second receiving space receiving the lens barrel, the internal threads engaged with the external threads; and
a case comprising a bottom plate and side plates, the bottom plate positioned on the image sensor unit, and comprising a first surface contacted with the substrate of the image sensor unit and a second surface facing away the first surface, the side plates extending from the second surface, the bottom plate and the side plates cooperatively defining a receiving room, the receiving room receiving the stationary magnetic field generator, the moveable magnetic field generator, and the base, a center of the bottom plate defining a circular first through hole, the image sensor passing through the first through hole and received in the receiving room, a diameter of the first through hole being larger than or equal to an internal diameter of the lens barrel, and being smaller than a diameter of the second receiving space; and
a double sided adhesive layer received in the receiving room and entirely covering the second face of the bottom plate.

12. The camera module of claim 11, wherein the supporting frame is substantially a cuboid frame and comprises four longitudinal posts and eight latitudinal posts, the longitudinal posts and the latitudinal posts at each side of the supporting frame cooperatively define a first receiving recess, the first receiving recess is in communication with the first receiving space and receives a respective permanent magnetic element.

13. The camera module of claim 12, wherein each upper portion of two side plates, which are opposite to each other, forms a projection perpendicularly protruding inwards from the corresponding side plate and protruding towards the receiving room, two opposite pairs of latitudinal posts each define a cutout, each projection snaps in a respective cutout.

14. The camera module of claim 12, further comprising two elastic plates, wherein two first positioning posts extend along an axial direction of the longitudinal posts from two opposite ends of each longitudinal post, each of the elastic plates has four first positioning holes defined in its corner, and each of the first positioning holes receives a respective one of the first positioning posts to position the two elastic plates on two opposite ends of the supporting frame.

15. The camera module of claim 14, wherein the core member comprises a top end and a bottom end, the core member also comprises eight second positioning posts, each four second positioning posts perpendicularly extend from a respective one of the top and bottom ends of the core member parallel to a central axis of the core member, each of the two elastic plates are substantially a rectangular sheet and comprises a second through hole defined in its center, each elastic plate comprises a substantially rectangular elastic portions around the second through hole and has four guiding holes defined in the elastic portion, and each guiding hole receives a respective one of the second positioning posts to position the two elastic plates on the top end and the bottom end.

16. The camera module of claim 15, wherein each elastic portions defines a plurality of slots around the second through hole.

17. The camera module of claim 15, wherein the base comprises a third through hole defined in its center, and four positioning openings around the third through hole, four first positioning posts adjacent to the bottom end are positioned in the positioning openings.

18. The camera module of claim 11, wherein the double sided adhesive layer defines a circular first opening aligned with the first through hole of the bottom plate, and a diameter of the first opening is equal to the diameter of the first through hole.

19. The camera module of claim 11, further comprising a front cover, wherein the shape and size of the front cover correspond to that of the case, the front cover covers the receiving room.

20. The camera module of claim 19, wherein the front cover comprises a circular second opening defined in its center, a diameter of the second opening is slightly larger than that of the second receiving space.

* * * * *